(12) United States Patent
Cao

(10) Patent No.: US 11,661,348 B2
(45) Date of Patent: May 30, 2023

(54) SOUND-ABSORBING MATERIAL PARTICLE AND PREPARATION METHOD THEREOF

(71) Applicant: GOERTEK INC., Weifang (CN)

(72) Inventor: Xiaodong Cao, Weifang (CN)

(73) Assignee: GOERTEK INC., Weifang (CN)

(*) Notice: Subject to any disclaimer, the term of this patent is extended or adjusted under 35 U.S.C. 154(b) by 1339 days.

(21) Appl. No.: 16/073,640

(22) PCT Filed: May 18, 2016

(86) PCT No.: PCT/CN2016/082477
§ 371 (c)(1),
(2) Date: Jul. 27, 2018

(87) PCT Pub. No.: WO2017/128563
PCT Pub. Date: Aug. 3, 2017

(65) Prior Publication Data
US 2019/0062170 A1 Feb. 28, 2019

(30) Foreign Application Priority Data

Jan. 28, 2016 (CN) .......................... 201610061508.1

(51) Int. Cl.
*C01B 39/02* (2006.01)
*C04B 38/00* (2006.01)
(Continued)

(52) U.S. Cl.
CPC .............. *C01B 39/02* (2013.01); *C04B 18/02* (2013.01); *C04B 35/18* (2013.01); *C04B 38/00* (2013.01);
(Continued)

(58) Field of Classification Search
None
See application file for complete search history.

(56) References Cited

U.S. PATENT DOCUMENTS

| 3,444,277 A | 5/1969 | McMillan et al. |
| 4,381,255 A * | 4/1983 | Nozemack ............ C01B 33/283 423/112 |
| 2002/0193234 A1 * | 12/2002 | Oda ........................ C04B 38/08 501/80 |

FOREIGN PATENT DOCUMENTS

| CN | 1404459 A | 3/2003 |
| CN | 1896026 A | 1/2007 |

(Continued)

OTHER PUBLICATIONS

Machine translation of Hideki et al., JP 2009227511 A (Year: 2009).*

(Continued)

*Primary Examiner* — Coris Fung
*Assistant Examiner* — Keling Zhang
(74) *Attorney, Agent, or Firm* — Saliwanchik, Lloyd & Eisenschenk

(57) ABSTRACT

The invention discloses a sound-absorbing material particle and a preparation method thereof. The method for preparing the sound-absorbing material particle comprises: mixing a sound-absorbing raw material with a solvent to form a sound-absorbing slurry; filling the sound-absorbing slurry into a mechanical compression die, and performing compression molding on the sound-absorbing slurry to form a particle; performing a hydrothermal crystallization reaction on the particle to crystallize the sound-absorbing raw material in the particle; and drying the particle to produce the sound-absorbing material particle.

8 Claims, 3 Drawing Sheets

---

Mixing a sound-absorbing raw material with a solvent to form a sound-absorbing slurry Filling the sound-absorbing slurry into a mechanical compression die, and performing compression molding on the sound-absorbing slurry to form a Performing a hydrothermal crystallization reaction on the particle to crystallize the sound-absorbing raw material in the particle Drying the particle to produce the sound-absorbing material particle cotton

(51) Int. Cl.
 *C04B 35/18* (2006.01)
 *C04B 18/02* (2006.01)
 *C04B 40/02* (2006.01)
 *G10K 11/162* (2006.01)
 *B01J 2/22* (2006.01)
 *C04B 111/52* (2006.01)

(52) U.S. Cl.
 CPC ........ *C04B 38/0054* (2013.01); *C04B 40/024* (2013.01); *G10K 11/162* (2013.01); *B01J 2/22* (2013.01); *C01P 2006/11* (2013.01); *C01P 2006/12* (2013.01); *C04B 2111/52* (2013.01); *C04B 2235/3463* (2013.01); *C04B 2235/3472* (2013.01); *C04B 2235/3481* (2013.01); *C04B 2235/5427* (2013.01); *C04B 2235/5436* (2013.01); *C04B 2235/602* (2013.01); *C04B 2235/606* (2013.01); *C04B 2235/656* (2013.01); *C04B 2235/6562* (2013.01); *C04B 2235/6584* (2013.01)

(56) References Cited

FOREIGN PATENT DOCUMENTS

| | | | | |
|---|---|---|---|---|
| CN | 102309975 A | * | 1/2012 | |
| CN | 103711274 A | | 4/2014 | |
| CN | 104844968 A | | 8/2015 | |
| CN | 105237033 A | | 1/2016 | |
| CN | 105731848 A | | 7/2016 | |
| EP | 0134333 A1 | * | 3/1985 | ............. B01J 29/06 |
| EP | 0640573 A1 | | 3/1995 | |
| JP | 2009227511 A | | 10/2009 | |

OTHER PUBLICATIONS

Harper et al., Adsorption of gases on 4A synthetic zeolite, Canadian Journal of Chemistry, 47, 1969, 4661-4670 (Year: 1969).*
Serrano et al., Preparation of extruded catalysts based on TS-1 zeolite for their application in propylene epoxidation, Catalysis Today, 143, 151-157, 2009 (Year: 2009).*
Machine translation of Du et al., CN 102309975A (Year: 2012).*

* cited by examiner

Mixing a sound-absorbing raw material with a solvent to form a sound-absorbing slurry Filling the sound-absorbing slurry into a mechanical compression die, and performing compression molding on the sound-absorbing slurry to form a Performing a hydrothermal crystallization reaction on the particle to crystallize the sound-absorbing raw material in the particle Drying the particle to produce the sound-absorbing material particle cotton

FIG. 1

SOUND-ABSORBING MATERIAL PARTICLE AND PREPARATION METHOD THEREOF

CROSS REFERENCE TO RELATED APPLICATIONS

This application is a National Stage of International Application No. PCT/CN2016/082477, filed on May 18, 2016, which claims priority to Chinese Patent Application No. 201610061508.1, filed on Jan. 28, 2016, both of which are hereby incorporated by reference in their entireties.

TECHNICAL FIELD

The invention belongs to the technical field of material processing, and in particular relates to a sound-absorbing material particle and preparation method thereof.

BACKGROUND

In recent years, as wearable electronic products have become thinner and lighter, traditional foamed sound-absorbing materials have failed to meet the requirements on tuning and calibrating of acoustic performance in the micro-speaker industry. Those skilled in the art constantly develop and experiment with new types of sound-absorbing materials. After verification, it was found that placing a porous sound-absorbing material in the back cavity of the speaker device can effectively improve its acoustic performance. At present, this new type of sound-absorbing materials with good application effects include non-foamed sound-absorbing materials such as natural zeolite, activated carbon, white carbon black, and zeolite powder with a silica-alumina mass ratio of 200 or more. In the application process, the above powdery non-foamed sound-absorbing material needs to be prepared into particles, and then the sound-absorbing material particles are filled into the back cavity of the speaker.

However, in the existing preparing processes, there are defects in the sound-absorbing material particles prepared by means of the commonly-used particle preparing methods. For example, the particles obtained by the extrusion method, boiling granulation method and rolling ball method are relatively poor in strength, the surface is not smooth and the particle size is uneven, the physical structure and performance are limited, and the main pore volume and pore size are small. The particles formed by the spray drying method are relatively small, and the particle size distribution is not uniform; the sound-absorbing material particles prepared by the oil column forming method need to be uniformly pulped and then condensed into particles, so it is necessary to add a binder or a coagulant in the slurry to solidify the slurry. However, the sound-absorbing material particles made under the action of the binder or the coagulant tend to be denser and have less void structure within the particles. For all of the above reasons, the mass transfer efficiency and sound-absorbing effect of zeolite-based sound-absorbing materials are greatly reduced.

Therefore, the inventors of the present invention believe that it is necessary to improve the preparation method of the sound-absorbing material particles so as to improve the performance of the sound-absorbing material particles.

SUMMARY

It is an object of the present invention to provide a new technical solution for preparing sound-absorbing material particles.

According to a first aspect of the present invention, there is provided a method of preparing sound-absorbing material particles, comprising: mixing a sound-absorbing raw material with a solvent to prepare a sound-absorbing slurry; filling the sound-absorbing slurry into a mechanical compression die, and performing compression molding on the sound-absorbing slurry to form a particle; performing a hydrothermal crystallization reaction on the particle to crystallize the sound-absorbing raw material in the particle; drying the particle to produce a sound-absorbing material particle.

Optionally, a mass ratio of the sound-absorbing raw material in the sound-absorbing slurry ranges from 35% to 75%.

Optionally, the particle has a diameter in the range of 0.05-1.0 mm.

Optionally, the hydrothermal crystallization reaction is performed in a hydrothermal device, wherein the hydrothermal device has a reactant; and the reactant includes a template agent.

Optionally, the purity of the template agent is greater than 95%, and the mass ratio of the template agent in the reactant ranges from 1% to 35%.

Optionally, the drying process is performed at a temperature in the range of 40-150° C., and the atmosphere in the drying process includes nitrogen gas.

Optionally, the method further comprises roasting the sound-absorbing material particle or the particle, the temperature range of the roasting treatment is 120-850° C., the heating rate of the roasting ranges from 20-120° C./h, and the roasting time range is 0.5-96 h.

More preferably, the content of oxygen in the atmosphere of the furnace gas for roasting is 0.1% to 21%.

The invention further provides a sound-absorbing material particle, wherein the particle size of the sound-absorbing material particle ranges from 0.05 mm to 1.0 mm, the specific surface area ranges from 250 $m^2/g$ to 850 $m^2/g$, the pore volume ranges from 0.2 ml/g to 2.0 ml/g, and the bulk density ranges from 0.25 g/ml to 0.95 g/ml.

Optionally, the pore volume of the micropores with a pore size of 0.5-45 μm in the sound-absorbing material particle accounts for 10%-85% of the total pore volume of the sound-absorbing material particle.

The inventors of the present invention discovered that in the prior art, although there are certain defects in the preparation methods of the sound-absorbing material particles. The sound-absorbing material particles obtained by these preparation methods also have better performance in different aspects. For example, the sound-absorbing material particles prepared by one preparation method have better sound-absorbing effects, while the sound-absorbing material particles prepared by another preparation method have relatively better mechanical strength. Therefore, those skilled in the art do not consider improving the preparation method of the sound-absorbing material particles, but rather select different preparation methods according to the desired properties of the sound-absorbing material particles. Therefore, the technical task to be completed by the present invention or the technical problem to be solved is never thought or expected by those skilled in the art, and using a mechanical compression die to process and shape the sound-absorbing raw material is not used in the technical field. As a result, the present invention is a new technical solution.

Additional features of the present invention and its advantages will become clear from the following detailed description of exemplary embodiments of the present invention with reference to the attached drawings.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 1 is a block diagram of steps of a method for preparing sound-absorbing material particles according to a specific embodiment of the present invention;

DETAILED DESCRIPTION

Figure 2:
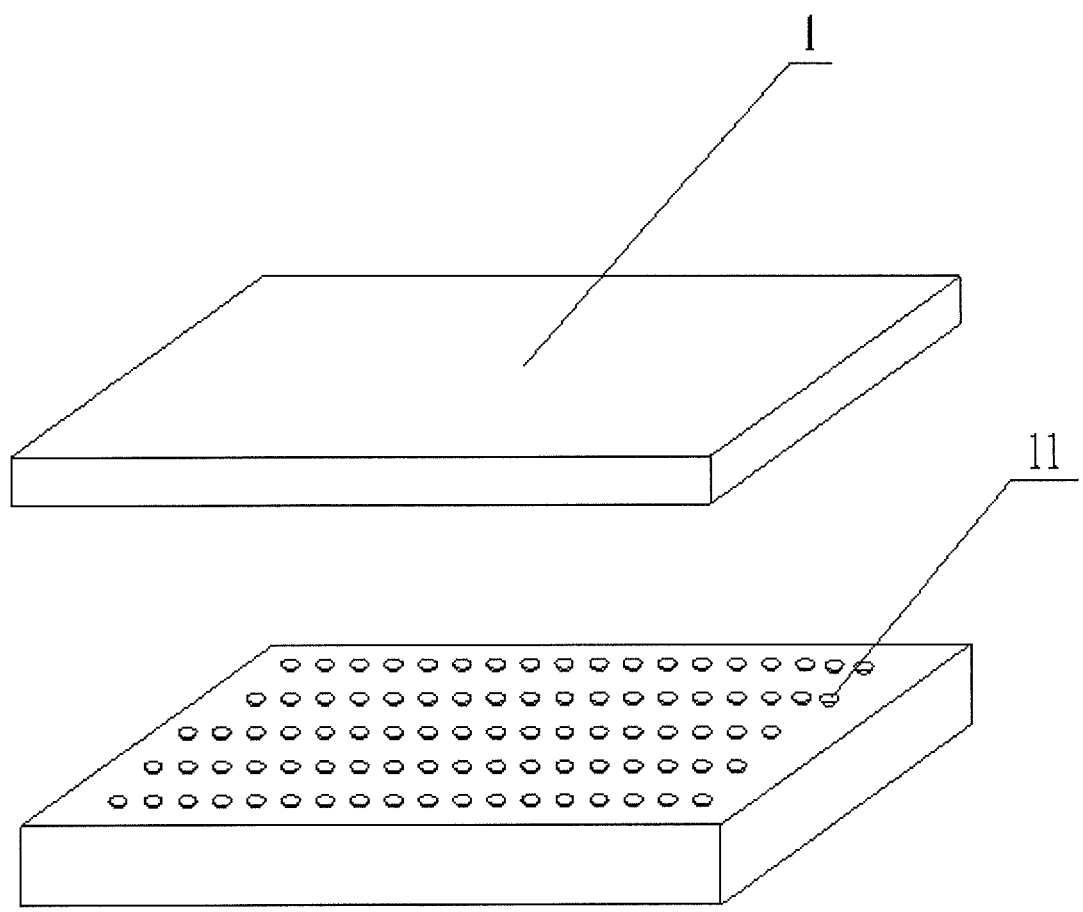
FIG. 2 is a schematic structural view of a mechanical compression die provided by an embodiment of the present invention.

Various exemplary embodiments of the present invention will now be described in detail with reference to the accompanying drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to be in any way limiting on the invention, its application, or uses.

Techniques, methods, and devices known to those ordinary skilled in the relevant art may not be discussed in detail, but the techniques, methods and devices should be considered as part of the specification where appropriate.

In all examples shown and discussed herein, any specific value should be interpreted as illustrative only rather than a limitation. Therefore, other examples of the exemplary embodiments may have different values.

It should be noted that similar reference numerals and letters refer to similar items in the following figures, and therefore, once an item is defined in one figure, it need not be further discussed in subsequent figures.

Figure 3:
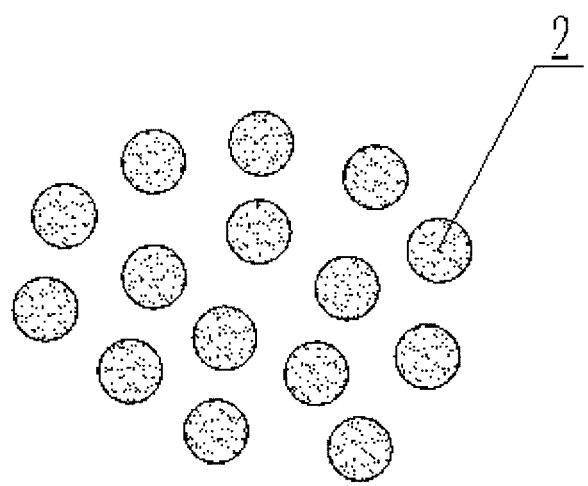
FIG. 3 is a schematic view of a particle prepared according to an embodiment of the present invention.
Figure 4:
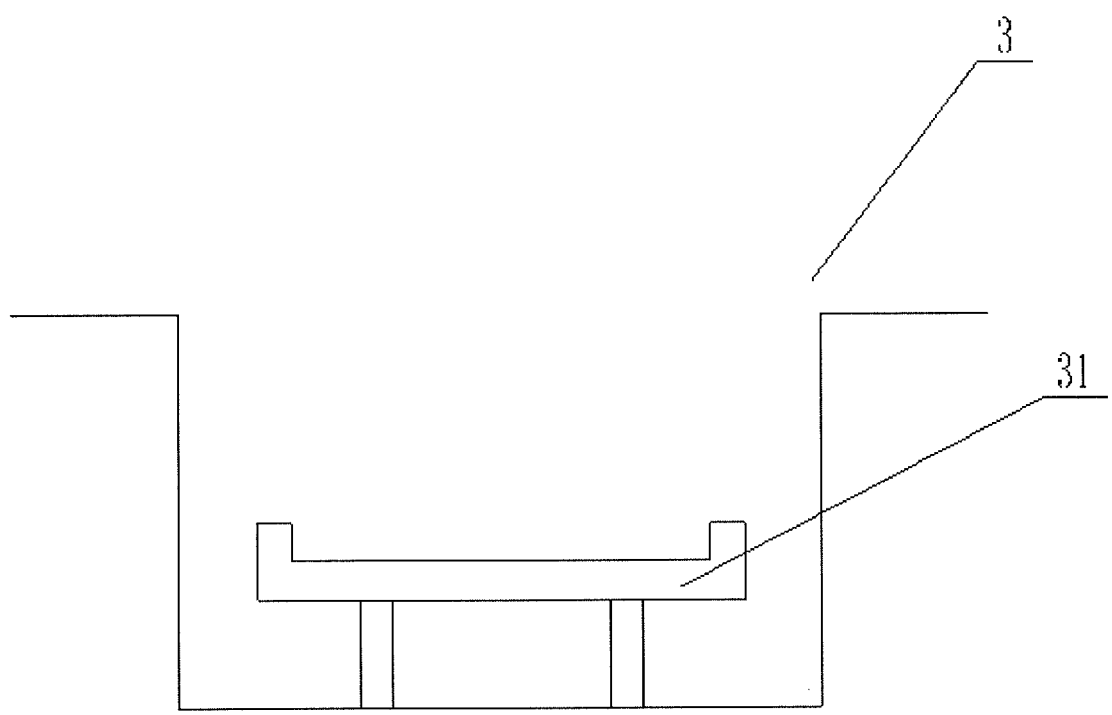
FIG. 4 is a schematic view of the structure of a hydrothermal device provided by an embodiment of the present invention.

The invention provides a new preparation method of the sound-absorbing material particle. The method processes the raw material of the sound-absorbing material into sound-absorbing material particles through a mechanical compression method. The sound-absorbing raw material is a crystalline powder material capable of providing an aluminum source and a silicon source. Usually, aluminosilicate powder, such as powder of a zeolite-type material, may be selected. As shown in FIG. 1, first of all, the sound-absorbing raw material is mixed with a solvent to form a sound-absorbing slurry. In order to facilitate the compression molding of the sound-absorbing slurry, the concentration and the viscosity of the sound-absorbing slurry are generally not too low. However, the present invention does not define the viscosity of the sound-absorbing slurry. In some special embodiments of the present invention, the sound-absorbing slurry with a low concentration can also be molded by controlling the conditions of the compression molding process. Secondly, the sound-absorbing slurry is filled into a mechanical compression die 1, and the mechanical compression die 1 performs compression molding process on the sound-absorbing slurry therein, thereby producing particles 2. As shown in FIG. 2, the mechanical compression die 1 may have a plurality of concave dies 11 for accommodating the sound-absorbing slurry. Opposite to the concave dies 11, the mechanical compression die 1 also has convex dies. When the mechanical compression die 1 is pressed to fit, the convex dies are pressed into the concave dies 11 to compact the sound-absorbing slurry in the concave dies 11 so that the sound-absorbing raw material forms wet particles 2, as shown in FIG. 3. The present invention does not limit the structure of the mechanical compression die 1 and the size of the concave dies, and those skilled in the art can design the structure of the mechanical compression die 1 and select the size of the concave dies 11 according to actual conditions. Thirdly, as shown in FIG. 4, the prepared particles 2 are put into a hydrothermal device 3 to perform a hydrothermal crystallization reaction. The hydrothermal crystallization reaction can crystallize the sound-absorbing raw material in the particles 2 and generate a microporous structure in the interior thereof. After the hydrothermal crystallization reaction, the particles 2 are subjected to a drying treatment to remove the moisture in the interior of the particles to produce the final sound-absorbing material particles. The sound-absorbing material particles prepared by the mechanical compression molding method provided by the present invention have the characteristics of high sphericity and smooth surface. Moreover, the particle size of the sound-absorbing material particles is uniform due to the compression molding of the mechanical compression die 1. By controlling the pressure of the compression molding process and the size of the mechanical compression die 1, the degree of compaction of the sound-absorbing material particles can be controlled to prevent the particles from becoming too dense and the pore channel structure from being insufficient.

Preferably, the mass ratio of the sound-absorbing raw material in the sound-absorbing slurry ranges from 35% to 75%. Those skilled in the art can select the mass proportion of the sound-absorbing raw material in the sound-absorbing slurry within the above range according to the actual requirements on the performance of the sound-absorbing material. As for the sound-absorbing slurry with different mass ratios of the sound-absorbing raw material, it is possible to control the conditions such as temperature and alkalinity of the compression molding process, to produce a desired particle.

Preferably, in the specific embodiment of the present invention, an auxiliary agent may be blended in the sound-absorbing slurry, and the auxiliary agent includes a coagulant, a defoaming agent, a homogenizer, and the like. The auxiliary agent is used to make the sound-absorbing raw material and the solvent thoroughly mixed to obtain a homogeneous sound-absorbing slurry with certain viscosity. More preferably, the mass ratio of the auxiliary agent to the sound-absorbing slurry should be within the range of 0.02% to 10%. If the amount of the auxiliary agent is too large, the sound-absorbing performance of the produced sound-absorbing material particles will also be affected. The present invention does not limit the type of the auxiliary agent. Those skilled in the art can blend different types of auxiliary agents into the sound-absorbing slurry according to actual conditions. For example, when the mixing process of the sound-absorbing raw material and the solvent is easy to generate foam, a defoaming agent may be blended in the sound-absorbing slurry to eliminate the foam. The present invention can also use other methods to improve the homogeneity of the sound-absorbing slurry. For example, a method of quantitative dropping and atomizing can be used to mix the solvent with the sound-absorbing raw material to form a homogeneous sound-absorbing slurry.

In order that the prepared sound-absorbing material particles can be applied to speaker structures of various sizes and structures, the particle size of the sound-absorbing material particles needs to be matched with the speaker structure. Preferably, in the embodiment of the present invention, the dimensions of the concave dies 11 and the convex dies of the mechanical compression die 1 shown in FIG. 2 may be adjusted so that the particle size of the generated particles 2 shown in FIG. 3 is in the range of 0.05-1.0 mm. Within this size range, the finally generated sound-absorbing material particles can adapt to the acoustic performance requirements of most miniature speakers as well as ordinary speakers. Of course, the present invention does not strictly limit the particle size of the particle and the sound-absorbing material particles, and those skilled in the art can adjust it according to actual conditions.

The hydrothermal crystallization reaction step is usually performed at a certain temperature, and in order to reach these reaction conditions, the hydrothermal crystallization reaction step can be completed in the hydrothermal device 3. For example, in one embodiment of the present invention, as shown in FIG. 3, the prepared particle may be placed on a bracket 31, and then the bracket 31 may be placed inside the hydrothermal device 3. The interior of the hydrothermal device 3 also has a reactant for providing moist conditions. In the hydrothermal device, it is convenient to control the parameters such as temperature and reaction conditions. Further, in order that the sound-absorbing raw material can generate a well-distributed microporous structure with a sufficient pore-volume during crystallization, the reactant may include a template agent for accelerating the crystallization process of the sound-absorbing raw material to generate a microporous structure. Preferably, the purity of the template agent is higher than 95%, and the mass ratio of the template agent in the reactant is in the range of 1%-35%. In this way, a stable and abundant pore-channel structure can be produced in the sound-absorbing raw material in the formed particle.

Further, the drying process step is used to remove moisture in the particle to generate structurally stable and dried sound-absorbing material particles. In particular, in the drying process, an inert gas may be used as a medium to prevent the polar defect sites in the microstructure of the particles 2 from reacting with active molecules in the air. The inert gas may be nitrogen. In addition, the ambient temperature of the drying process can be appropriately increased. Alternatively, the particles 2 may be placed in an inert gas at a temperature between 40° C. and 150° C. In this way, the reactant and the solvent in the particles 2 can be discharged more effectively. Those skilled in the art can adjust the parameters in the drying process according to the conditions actually applied to the speaker structure and the acoustic properties of the sound-absorbing material particles, and accordingly set specific temperature curves and drying media.

Since the temperature of the drying treatment step is low and the time is short, it is impossible to discharge water molecules between molecules in the sound-absorbing material particles. Although the dried sound-absorbing material particles can be put into use, they do not fully exert sound-absorbing properties. Therefore, it is more preferable that the particles 2 subjected to the hydrothermal crystallization reaction or the dried sound-absorbing material particles be subjected to roasting treatment. The roasting process is performed at a temperature range of 120° C.-850° C., and the roasting time is allowed to be between 0.5 h and 96 h. The relatively long-time roasting treatment at a relatively high temperature can discharge the liquid molecules and impurities in the sound-absorbing material particles or the particles 2, thereby improving the acoustic performance of the sound-absorbing material particles. In particular, the heating rate of the roasting treatment cannot be too fast, otherwise the microscopic pore-channel structure of the sound-absorbing material particles will be seriously damaged. Generally, the heating rate of the roasting is in the range of 20-120° C./h. When the roasting temperature is selected to be moderate, for example, 350° C., the heating rate of 45° C./h can be selected for roasting, and the roasting time is 30 hours. In this way, the liquid molecules in the sound-absorbing material particles can be substantially removed, and impurities such as template agents and auxiliary agents can be discharged. More preferably, the roasting temperature may be in the range of 280-550° C., the roasting time is in the range of 20-65 hours, and the heating rate of the roasting temperature is in the range of 25-65° C./h. The present invention does not accurately limit the temperature, time, and heating rate during roasting. Those skilled in the art can adjust these parameters according to actual conditions. The wide temperature, time, and heating rate ranges described in the present invention include those that can be used in some special cases.

In particular, the content of oxygen may be between 0.1% and 21% in the atmosphere of the calcinated furnace gas. Oxygen can react with impurities in the sound-absorbing material particles or in the microporous structures in the particles 2, to discharge the impurities from the microporous structure, activate the microporous structure, and enhance the air-passing ability of the sound-absorbing material particles. Those skilled in the art can select the content of oxygen according to actual conditions, or can also add a small amount of other active atmosphere in the atmosphere of the roasting furnace gas, which is not limited by the present invention.

According to the present invention, the sound-absorbing slurry is pressed into the particles 2 by the mechanical compression die 1, so that the sound-absorbing material particles having a smooth surface, high sphericity, and uniform particle size can be obtained. In addition, the sound-absorbing material particles subjected to the compression molding process have high mechanical strength and are unlikely to cause powdering, dropping and damages, and the like. Further, the method provided by the present invention does not require the use of an adhesive or only a small amount of the adhesive, which can avoid or reduce the influence of the adhesive on the sound-absorbing material particles and effectively strengthen the air-passing ability of the sound-absorbing material particles.

The present invention also provides a sound-absorbing material particle prepared by the method provided by the present invention. First of all, the particle size of the sound-absorbing material particles ranges from 0.05 to 1.0 mm, and the sound-absorbing material particles in this size range can be applied to various speaker structures. The specific surface area of the sound-absorbing material particles is in the range of 250-850 $m^2/g$, and the specific surface area is preferably in the range of 250-550 $m^2/g$. In particular, the pore volume of the microporous structure should be between 0.2 ml/g and 2.0 ml/g. When the pore volume of the sound-absorbing material particles is within this range, a good sound-absorbing effect can be provided. More preferably, the pore volume of the microporous structure can be between 0.25 ml/g and 0.65 ml/g. In addition, the bulk density of the sound-absorbing material particles should be between 0.25 g/ml and 0.95 g/ml, and more preferably, the bulk density can be between 0.35 g/ml and 0.75 g/ml.

In particular, in the sound-absorbing material particles, micropores with a pore size of 0.5-45 µm are mainly used for sound absorption and aeration. Therefore, the pore volume of the micropores with a pore size within this range needs to reach a certain amount, so that the sound-absorbing material particles can provide good sound absorption and aeration effects in the speaker's back cavity. In the present invention, according to the different structures and acoustic performances of different speakers, the pore volume of micropores with a pore size of 0.5-45 micrometers accounts for 10%-85% of the total pore volume of the sound-absorbing material particles. Those skilled in the art can select within the above range according to actual application conditions.

Although particular embodiments of the present invention have been illustrated by way of examples, it will be understood by those skilled in the art that the foregoing examples are provided for the purpose of illustration and are not intended to limit the scope of the present invention. Those skilled in the art should understand that the foregoing embodiments may be modified without departing from the scope and spirit of the present invention. The scope of the present invention is defined by the attached claims.

What is claimed is:

1. A method for preparing a sound-absorbing material particle, comprising:
    mixing a sound-absorbing raw material with a solvent to make a sound-absorbing slurry;
    filling the sound-absorbing slurry into a mechanical compression die, and performing compression molding on the sound-absorbing slurry to form a particle;
    performing a hydrothermal crystallization reaction on the particle to crystallize the sound-absorbing raw material in the particle and generate a microporous structure in an interior thereof, wherein a pore volume of the microporous structure is between 0.2 ml/g and 2.0 ml/g; and
    drying the particle, after performing the hydrothermal crystallization reaction, to produce the sound-absorbing material particle,
    wherein the sound-absorbing material particle or the particle, after performing the hydrothermal crystallization reaction, is subjected to a roasting process, wherein the roasting process is performed at a roasting temperature in a range of 280° C. to 550° C., wherein a heating rate of the roasting process ranges from 25° C./h to 65° C./h, and wherein a roasting time of the roasting process is in a range of 20 h to 65 h.

2. The method according to claim 1, wherein a mass ratio of the sound-absorbing raw material in the sound-absorbing slurry ranges from 35% to 75%.

3. The method according to claim 1, wherein the particle has a diameter in a range of 0.05-1.0 mm.

4. The method according to claim 1, wherein the hydrothermal crystallization reaction is performed in a hydrothermal device, wherein the hydrothermal device has a reactant, and the reactant comprises a chemical template agent.

5. The method according to claim 4, wherein the purity of the chemical template agent is greater than 95%, and a mass ratio of the chemical template agent in the reactant ranges from 1% to 35%.

6. The method according to claim 1, wherein the drying process is performed at a temperature in a range of 40° C. to 150° C., and an atmosphere for the drying process includes nitrogen gas.

7. The method according to claim 1, wherein the mechanical compression die comprise concave dies for accommodating the sound-absorbing slurry and convex dies opposite to the concave dies, and
    wherein, when the mechanical compression die is pressed to fit, the convex dies are pressed into the concave dies to compact the sound-absorbing slurry in the concave dies so that the sound-absorbing raw material forms particles.

8. The method according to claim 1, wherein no adhesive is used.

* * * * *